(12) United States Patent
Amidon et al.

(10) Patent No.: US 8,260,266 B1
(45) Date of Patent: Sep. 4, 2012

(54) METHOD AND SYSTEM FOR THIRD-PARTY DISCOVERY OF PROXIMITY-BASED SERVICES

(75) Inventors: Christopher M. Amidon, Apex, NC (US); Richard J. Walsh, Raleigh, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1017 days.

(21) Appl. No.: 11/768,643

(22) Filed: Jun. 26, 2007

(51) Int. Cl.
H04M 3/42 (2006.01)

(52) U.S. Cl. ............... 455/414.1; 705/14.64; 715/700

(58) Field of Classification Search .......... 455/422, 455/445, 414, 456, 417, 461, 459, 458, 414.1; 370/338; 709/225, 227; 340/7, 0.28, 7.21, 340/28
See application file for complete search history.

(56) References Cited

U.S. PATENT DOCUMENTS

| | | | |
|---|---|---|---|
| 5,420,606 A | 5/1995 | Begum et al. | |
| 5,736,982 A | 4/1998 | Suzuki et al. | |
| 5,923,330 A | 7/1999 | Tarlton et al. | |
| 6,256,043 B1 | 7/2001 | Aho et al. | |
| 6,349,301 B1 | 2/2002 | Mitchell et al. | |
| 6,453,294 B1 | 9/2002 | Dutta et al. | |
| 6,466,213 B2 | 10/2002 | Bickmore et al. | |
| 6,545,682 B1 | 4/2003 | Ventrella et al. | |
| 6,580,811 B2 | 6/2003 | Maurer et al. | |
| 6,629,136 B1 | 9/2003 | Naidoo | |
| 6,647,269 B2 * | 11/2003 | Hendrey et al. | 455/456.3 |
| 6,672,961 B1 | 1/2004 | Uzun | |
| 6,795,972 B2 | 9/2004 | Rovira | |
| 6,854,012 B1 | 2/2005 | Taylor | |
| 6,910,186 B2 | 6/2005 | Kim | |
| 6,948,131 B1 | 9/2005 | Neven et al. | |
| 7,006,098 B2 | 2/2006 | Bickmore et al. | |
| 7,034,678 B2 | 4/2006 | Burkley et al. | |
| 7,036,082 B1 | 4/2006 | Dalrymple et al. | |

(Continued)

FOREIGN PATENT DOCUMENTS

EP 1473650 A1 3/2004
(Continued)

OTHER PUBLICATIONS

Smith, Steve; "Tapping the Feed: in search of an RSS Money Trail" Econtent; Mar. 2005; vol. 28, Issue 3; p. 30-34.
(Continued)

Primary Examiner — Jean Gelin
Assistant Examiner — Mahendra Patel
(74) Attorney, Agent, or Firm — Withrow & Terranova, PLLC

(57) ABSTRACT

A system and method for third-party discovery of proximity-based services are provided. In general, a mobile device of a proximity user collects service metadata or information from service providers within its proximity via, for example, local wireless communication. The service metadata is then published to one or more third-party users. More specifically, in one embodiment, the mobile device provides the service metadata to a service discovery system. In response, the service discovery system provides the service metadata or some representation thereof to a client device of a third-party user subscribed to the service metadata. The third-party user may then be enabled to generate a service request. For example, if the service metadata is an advertisement, the third-party user may generate a service request that is provided either directly or indirectly to the mobile device asking that the advertised product or service be purchased on behalf of the third-party user.

23 Claims, 8 Drawing Sheets

U.S. PATENT DOCUMENTS

| | | | |
|---|---|---|---|
| 7,107,549 | B2 | 9/2006 | Deaton et al. |
| 7,145,898 | B1 | 12/2006 | Elliott |
| 7,155,210 | B2 | 12/2006 | Benson |
| 7,197,126 | B2 | 3/2007 | Kanada |
| 7,248,677 | B2 | 7/2007 | Randall et al. |
| 7,396,281 | B2 | 7/2008 | Mendelsohn et al. |
| 7,599,983 | B2 | 10/2009 | Harper et al. |
| 7,849,420 | B1 | 12/2010 | Amidon et al. |
| 2001/0021920 | A1 | 9/2001 | Ikeda |
| 2002/0095333 | A1* | 7/2002 | Jokinen et al. ............ 705/14 |
| 2002/0123355 | A1* | 9/2002 | Hosono ............ 455/456 |
| 2003/0028621 | A1 | 2/2003 | Furlong et al. |
| 2003/0051255 | A1 | 3/2003 | Bulman et al. |
| 2004/0015562 | A1 | 1/2004 | Harper et al. |
| 2004/0179039 | A1 | 9/2004 | Blattner et al. |
| 2004/0189701 | A1 | 9/2004 | Badt, Jr. |
| 2004/0199867 | A1 | 10/2004 | Brandenborg |
| 2004/0240652 | A1 | 12/2004 | Kanada |
| 2005/0010637 | A1 | 1/2005 | Dempski et al. |
| 2005/0060746 | A1 | 3/2005 | Kim |
| 2005/0131761 | A1 | 6/2005 | Trika et al. |
| 2005/0137015 | A1 | 6/2005 | Rogers et al. |
| 2005/0165795 | A1* | 7/2005 | Myka et al. ............ 707/100 |
| 2005/0210387 | A1* | 9/2005 | Alagappan et al. ........ 715/700 |
| 2005/0264647 | A1 | 12/2005 | Rzeszewski et al. |
| 2006/0064645 | A1 | 3/2006 | Neven et al. |
| 2006/0111188 | A1 | 5/2006 | Winkler |
| 2006/0195515 | A1 | 8/2006 | Beaupre et al. |
| 2006/0235790 | A1 | 10/2006 | Jung et al. |
| 2006/0277474 | A1 | 12/2006 | Robarts et al. |
| 2006/0282391 | A1 | 12/2006 | Peterka et al. |
| 2006/0282516 | A1* | 12/2006 | Taylor et al. ............ 709/220 |
| 2007/0013701 | A1 | 1/2007 | Segawa et al. |
| 2007/0184855 | A1 | 8/2007 | Klassen et al. |
| 2007/0223675 | A1 | 9/2007 | Surin et al. |
| 2007/0288470 | A1* | 12/2007 | Kauniskangas et al. ........ 707/10 |
| 2007/0299681 | A1* | 12/2007 | Plastina et al. ............ 705/1 |
| 2010/0267398 | A1* | 10/2010 | Kim et al. ............ 455/456.3 |

FOREIGN PATENT DOCUMENTS

| | | | |
|---|---|---|---|
| EP | 1689143 | A1 | 10/2004 |
| WO | WO 02/057972 | A2 | 7/2002 |
| WO | WO 2005/020129 | A2 | 3/2005 |

OTHER PUBLICATIONS

Krol, Carol; "RSS ad programs feed needs" B to B; Jul. 11, 2005; vol. 90 Issue 9; p. 1-33.

No Author, "Latest Press Releases," Comverse, Jun. 13, 2006, http://www.comverse.com/press_releases.aspx?newsId=412, updated and accessed May 17, 2007.

No Author, "Personalize Skype—Invent Yourself," http://skype.klonies.com/studio.php, accessed May 17, 2007.

No Author, "Gravatar—Globally Recognized Avatars," Gravatar—Your Identity—Online, Jan. 18, 2007, http://site.gravatar.com, accessed May 17, 2007.

No Author, "Cyworld", http://us.cyworld.com/main/index.php, accessed May 17, 2007.

No Author, "Youniversal Branding: Part 1," Youniversal Branding—Branding in virtual worlds, metaverses and online communities, Jul. 22, 2006, http://www.trendwatching.com/trends/YOUNIVERSALBRANDING.htm, accessed May 17, 2007.

No Author, "Yahoo! Avatars", Yahoo! Messenger, Jun. 26, 2004, http://messenger.yahoo.com/avatars.php, accessed May 17, 2007.

No Author, "Welcome to Luskwood Creatures!", Luskwood Creatures, Feb. 9, 2006, http://www.luskwood.com/index.htm, accessed May 17, 2007.

Cashmore, P., "Meez—Avatars for MySpace, Xanga and IM", Mashable!—The Social Networking Blog, Aug. 22, 2006, http://mashable.com/2006/08/22/meez-avatars-for-myspace-xanga-and-im, accessed May 17, 2007.

No Author, "MySpace Home Page", MySpace, created Jan. 17, 1997, http://www.myspace.com, accessed May 31, 2007.

El Kaliouby, R., et al., FAIM: Integrating Automated Facial Affect Analysis in Instant Messaging, University of Cambridge Computer Laboratory, IUI '04, Jan. 13-16, 2004, 3 pages.

No Author, "Pandora on the Web", Pandora Radio, Nov. 30, 2001, http://www.pandora.com, accessed May 31, 2007.

No Author, "Rhapsody Online," Rhapsody—Free access to millions of songs online, Jun. 17, 2004, http://www.rhapsody.com/home.html, accessed May 31, 2007.

No Author, "botme.com Home Page," Botme.com—java mobile games, mobile games, java games, V-girl, V-boy, V-Penguins, Jun. 13, 2006, http://www.botme.com/portal/, accessed Jul. 25, 2007.

No Author, "Skype to Debut New Avatar Product From Comverse: Klonies", Comverse, Jun. 7, 2006, http://www.comverse.com/press_releases.aspx?newsId=412, accessed Jul. 25, 2007.

No Author, "Latest Press Releases," Comverse, Jun. 13, 2006, http://www.comverse.com/press_releases.aspx?newsId=412, updated and accessed Mar. 26, 2007.

No Author, "Personalize Skype—Invent Yourself," http://skype.klonies.com/studio.php, accessed Mar. 26, 2007.

No Author, "Gravatar—Globally Recognized Avatars," Gravatar—Your Identity—Online, Jan. 18, 2007, http://site.gravatarcom, accessed Mar. 26, 2007.

No Author, "Cyworld", http://us.cyworld.com/main/index.php, accessed Mar. 26, 2007.

No Author, "Youniversal Branding: Part 1," Youniversal Branding—Branding in virtual worlds, metaverses and online communities, Jul. 22, 2006, http://www.trendwatching.com/trends/YOUNIVERSALBRANDING.htm, accessed Mar. 26, 2007.

No Author, "Yahoo! Avatars", Yahoo! Messenger, Jun. 26, 2004, http://messenger.yahoo.com/avatars.php, accessed Mar. 26, 2007.

No Author, "Welcome to Luskwood Creatures!", Luskwood Creatures, Feb. 9, 2006, http://www.luskwood.com/index.htm, accessed Mar. 26, 2007.

\* cited by examiner

METHOD AND SYSTEM FOR THIRD-PARTY DISCOVERY OF PROXIMITY-BASED SERVICES

FIELD OF THE INVENTION

The present invention relates to proximity-based services and more specifically relates to third-party discovery of proximity-based services.

BACKGROUND OF THE INVENTION

With the proliferation of Bluetooth-enabled mobile devices, proximity-based services are beginning to emerge. For example, a mobile device may receive billboard advertisements from sources within its proximity, obtain digital content shared by other devices within its proximity, provide kiosk-based functionality for services within its proximity, or the like via a Bluetooth interface. In areas such as shopping malls where there are many service providers, the mobile device may be flooded with proximity-based service information. Additionally, the proximity-based service information may be of interest to third-party users such as friends, family, or other contacts of the user of the mobile device that are not in proximity to the service providers. Thus, there is a need for a system and method for enabling third-party discovery of proximity-based services.

SUMMARY OF THE INVENTION

The present invention provides a system and method for third-party discovery of proximity-based services. In general, a mobile device of a proximity user collects service metadata or information from service providers within its proximity via, for example, local wireless communication. The service metadata is then published to one or more third-party users. More specifically, in one embodiment, the mobile device provides the service metadata to a service discovery system. In response, the service discovery system provides the service metadata or some representation thereof to a client device of a third-party user subscribed to the service metadata. The third-party user may then be enabled to generate a service request. For example, if the service metadata is an advertisement, the third-party user may generate a service request that is provided either directly or indirectly to the mobile device asking that the advertised product or service be purchased on behalf of the third-party user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
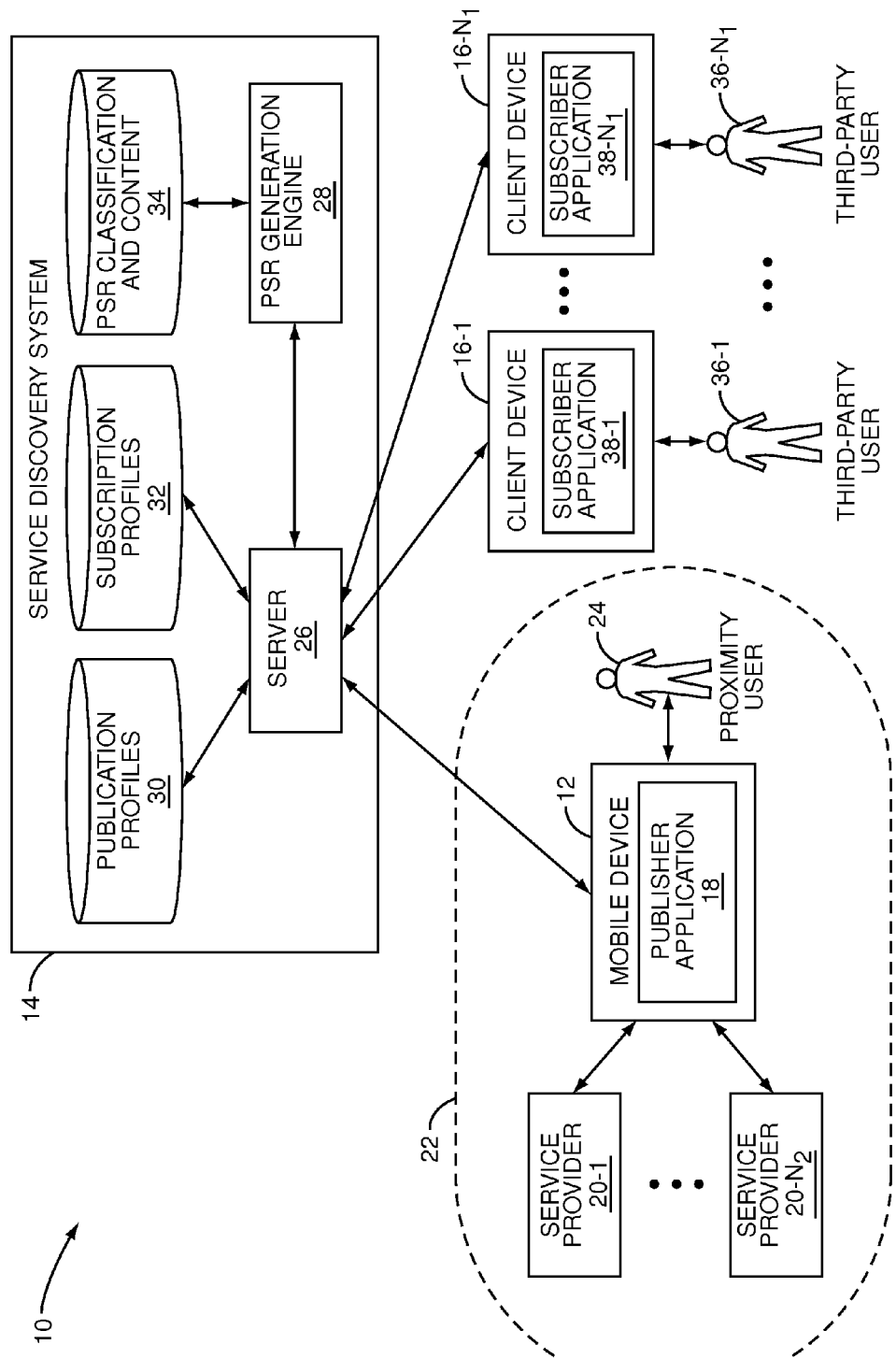
FIG. 1 illustrates a system enabling third-party discovery of proximity-based services according to one embodiment of the present invention.

FIG. 1 illustrates a system 10 enabling third-party discovery of proximity-based services according to one embodiment of the present invention. In general, the system 10 includes a mobile device 12, a service discovery system 14, and a number of client devices 16-1 through 16-$N_1$. The mobile device 12 communicates with the service discovery system 14 via a network which may include wired and/or wireless components. For example, the mobile device 12 may be connected to the service discovery system 14 via the Internet, where the mobile device 12 has access to the Internet via an associated cellular network, wireless Local Area Network (LAN), or the like. The service discovery system 14 is also connected to the client devices 16-1 through 16-$N_1$ via a network, which may include wired and/or wireless components. For example, the client device 16-1 may be a mobile device connected to the service discovery system 14 via the Internet, where the client device 16-1 has access to the Internet via a cellular network, wireless LAN, or the like. In contrast, the client device 16-$N_1$ may be, for example, a personal computer connected to the service discovery system 14 via the Internet, where the client device 16-$N_1$ has access to the Internet via a wired connection such as, for example, an Ethernet port.

The mobile device 12 may be, for example, a mobile telephone, Personal Digital Assistant (PDA), or the like. The mobile device 12 includes a publisher application 18, which may be implemented in software, hardware, or a combination thereof. In general, the publisher application 18 operates to collect service metadata or information from a number of service providers 20-1 through 20-$N_2$ within a proximate area 22 of the mobile device 12 and provide the service metadata to the service discovery system 14. Preferably, the mobile device 12 communicates with the service providers 20-1 through 20-N$_2$ via a local wireless communication interface (see FIG. 8) such as, for example, a Bluetooth communication interface, a communication interface operating according to one of the suite of IEEE 802.11 standards, a Wireless Fidelity (Wi-Fi) communication interface, or the like. In this embodiment, the proximate area 22 of the mobile device 12 is the local wireless communication range of the mobile device 12. The mobile device 12 is carried by or otherwise associated with a proximity user 24. As such, as the location of the proximity user 24 and thus the mobile device 12 changes, the proximate area 22 of the mobile device 12 also changes.

The service providers 20-1 through 20-N$_2$ may be, for example, servers or other devices associated with businesses; personal devices such as personal computers, mobile telephones, or PDAs; or the like. In general, the service providers 20-1 through 20-N$_2$ operate to broadcast or otherwise transmit service metadata or information to devices such as the mobile device 12 that are proximate to the service providers 20-1 through 20-N$_2$. For example, the service provider 20-1 may be a server or other device associated with a store, and the service metadata may be one or more advertisements for products or services sold in the store; one or more coupons for products or services sold in the store; a notice of free products or services offered in the store; information identifying or describing digital content items such as songs, movies, television programs, or virtual objects for use in a virtual environment sold or otherwise made accessible by the store; information relating to collaboration or gaming activities such as chat sessions, scavenger hunts, or contests; or the like. As another example, the service provider 20-1 may be a device such as a mobile telephone, PDA, personal computer, or the like associated with a user, and the service metadata may be information identifying or describing digital content items such as songs, movies, television programs, or virtual objects made accessible by the device; a user profile or information from a user profile of the user of the device; or the like.

In one embodiment, the service metadata published by, for example, the service provider 20-1 includes information defining a type of the service metadata, access rights for the service metadata, a targeted group of users, a rating, quality, availability, and content. The type of the service metadata may be, for example, an advertisement, a coupon, notice of a free product or service, content sharing, a collaboration or gaming activity such as a chat session or contest, or the like. The access rights may define or restrict a class of users permitted to access the service metadata. For example, the access rights of the service metadata may be open or unlimited, a defined number of levels deep within a social network, password protected, or the like. As another example, the access rights may be related to business relationships such that, for example, only users having paid a subscription fee for a premium service level have access to the service metadata, the service metadata is free to all users, or the like. The targeted group of users may be, for example, a defined age range such as teenagers, a defined demographic such as women or college students, or the like. The rating may be, for example, G, PG, R, or the like. The quality may be a quality or user rating for the associated service or product. The availability may reflect, for example, connection strength and general system availability. The content may be, for example, an advertisement including graphics or text for the advertisement, a coupon, information describing or identifying digital content items made accessible by the service provider 20-1, 20-N$_2$, previews or thumbnails of digital content items made accessible by the service provider 20-1, 20-N$_2$, or the like.

It should be noted that while only the mobile device 12 is illustrated in FIG. 1, the system 10 may include any number of mobile devices 12 operating to publish proximity-based service metadata. In addition, while the mobile device 12 is described herein as only a publisher of service metadata, the present invention is not limited thereto. The mobile device 12 may be both a publisher of service metadata and a subscriber to service metadata published by other mobile devices.

The service discovery system 14 includes a server 26, a Proximity-based Service Representation (PSR) generation engine 28, a publication profiles database 30, a subscription profiles database 32, and a PSR classification and content database 34. While a single server 26 and PSR generation engine 28 are illustrated for clarity and ease of discussion, the operation of the server 26 and the PSR generation engine 28 may be distributed among any number of servers in order to provide, for example, load balancing and redundancy. Each of the server 26 and the PSR generation engine 28 may be implemented in software, hardware, or a combination thereof. The operation of the server 26 and PSR generation engine 28 is discussed below. The publication profiles database 30 stores one or more publication profiles for the proximity user 24 associated with the mobile device 12 as well as one or more publication profiles for users associated with any other mobile devices operating to publish service metadata within the system 10. Note that the publication profiles may alternatively be configured for the mobile device 12 rather than the proximity user 24. Further, while the publication profiles are stored at the service discovery system 14 in this embodiment, the publication profiles may additionally or alternatively be partially or completely stored by the associated mobile devices.

In one embodiment, a publication profile includes service criteria for determining whether specific service metadata is to be published and therefore provided to the service discovery system 14. The service criteria may include type, quality, availability, and/or classification criteria. The service metadata may additionally or alternatively include information defining locations from which the mobile device 12 should or should not publish service metadata, times during which the mobile device 12 should or should not publish service metadata, information defining environmental factors or characteristics that should or should not be present for the mobile device 12 to publish service metadata, information defining users or classes of users that if present within the proximate area 22 result in the mobile device 12 publishing or not publishing service metadata, information defining a threshold activity level of the mobile device 12 such that service metadata is not published by the mobile device 12 when operating above the threshold activity level or is published only when the mobile device 12 is operating below the threshold activity level, or the like.

In addition or alternatively, the publication profile may include information defining individual users or classes of users to which service metadata may be published. This information may define specific users and/or multiple classes of users and access rights of each of the specific users or classes of users. Individual users may be defined by user identifiers, a contact list of the proximity user 24, or the like. Classes of users may be defined as, for example, the general public; users belonging to a specific group; users matching defined social network parameters such as being within a defined number of levels from the proximity user 24 within a social network, having a specific relationship type with the proximity user 24 within a social network, or having a defined relationship strength to the proximity user 24 in a social network; or the like. Note that only one publication profile may be configured. Alternatively, separate publication profiles may be configured for different subscribing users, different classes of subscribing users, different sets of service criteria, different locations, different schedules including times of the day or days of the week, different activity levels of the mobile device 12, or the like.

As discussed below, the publication profiles are used to filter service metadata and to identify third-party users to which the service metadata is to be published. In addition to the publication profiles, an operator of the network interconnecting the mobile device 12 and the service discovery system 14 may impose additional filtering criteria. For example, if the mobile device 12 is connected to the service discovery system 14 via a cellular network, an operator of the cellular network may impose filtering criteria such that the mobile device 12 can only publish service metadata from service providers that have registered with the operator of the cellular network, are business partners with the operator of the cellular network, or the like. The criteria imposed by the operator may be imposed at the mobile device 12, the service discovery system 14, or some intermediate node in the network.

The subscription profiles database 32 includes one or more subscription profiles for third-party users 36-1 through 36-N₁ associated with the client devices 16-1 through 16-N₁. Note that the subscription profiles may alternatively be configured for the client devices 16-1 through 16-N₁ rather than the third-party users 36-1 through 36-N₁. Thus, in one embodiment, the subscription profiles may be user based profiles. In another embodiment, the subscription profiles may be device based profiles. The subscription profiles generally define the service metadata of interest to the third-party users 36-1 through 36-N₁. More specifically, in one embodiment, a subscription profile of the third-party user 36-1 may include service criteria defining service metadata of interest to the third-party user 36-1. The service criteria may include, for example, one or more types of service metadata, one or more quality criteria, one or more availability criteria, and/or one or more classifications. In addition or alternatively, the subscription profile may include information identifying particular proximity users or classes of users such as the proximity user 24 to which to subscribe. The proximity users or classes of users may be identified as the general public, as all users belonging to a defined group, as users matching various social network parameters, as users at a defined location, as users identified by a contacts list of the third-party user 36-1, by specific user identifiers, or the like. In addition or alternatively, the subscription profile may include information identifying locations from which the client device 16-1 should or should not subscribe to service metadata, times during which the client device 16-1 should or should not subscribe to service metadata, information defining environmental factors or characteristics that should or should not be present for the client device 16-1 to subscribe to service metadata, information defining users or classes of users that if proximate to the client device 16-1 result in the client device 16-1 subscribing or not subscribing to service metadata, information defining a threshold activity level of the client device 16-1 such that the client device 16-1 does not subscribe to service metadata when operating above the threshold activity level or subscribes to service metadata only when operating below the threshold activity level, or the like. The client device 16-1 may configure only one subscription profile. Alternatively, the client device 16-1 may configure separate subscription profiles for different proximity users, different classes of proximity users, different sets of service criteria, different locations, different schedules including times of the day or days of the week, different activity levels of the client device 16-1, or the like.

The PSR classification and content database 34 stores an ontology, taxonomy, or other data structure defining a number of PSRs and when the PSRs are applicable. As used herein, a PSR is some representation or indicia indicative of or descriptive of service metadata. As an example, a PSR may be a graphic or other visual representation that is descriptive of the service metadata. In one embodiment, the PSR classification and content database 34 includes an ontology, where each node in the ontology corresponds to a PSR. Each node includes one or more rules defining when the corresponding PSR is applicable and content such as a graphic or other indicia corresponding to the PSR itself. As discussed below, the rules may be applied to service metadata to identify PSRs that are applicable to the service metadata.

The client devices 16-1 through 16-N₁ may be personal computers, mobile devices, or the like. In general, the client devices 16-1 through 16-N₁ include subscriber applications 38-1 through 38-N₁, which may be implemented in software, hardware, or a combination thereof. In operation, the subscriber applications 38-1 through 38-N₁ enable the third-party users 36-1 through 36-N₁ to configure their subscription profiles. Alternatively, the third-party users 36-1 through 36-N₁ may be enabled to configure their subscription profiles via a web server or the like associated with the service discovery system 14. The subscription profiles may then be pushed to the client devices 16-1 through 16-N₁. In addition, as discussed below, the subscriber applications 38-1 through 38-N₁ receive PSRs that are indicative of service metadata to which the third-party users 36-1 through 36-N₁ have subscribed, display the PSRs to the third-party users 36-1 through 36-N₁, and optionally enable the third-party users 36-1 through 36-N₁ to interact with the PSRs to further explore the service metadata and/or generate service requests.

Before proceeding, it should be noted that while the service discovery system 14 is illustrated as a centralized system, the present invention is not limited thereto. The functionality of the service discovery system 14 may alternatively be implemented on the mobile device 12, the client devices 16-1 through 16-N₁, or a combination of the mobile device 12 and one or more of the client devices 16-1 through 16-N₁. As another alternative, the operation of the service discovery system 14 may be distributed among one or more centralized systems and one or more of the mobile device 12 and the client devices 16-1 through 16-N₁.

Figure 2:
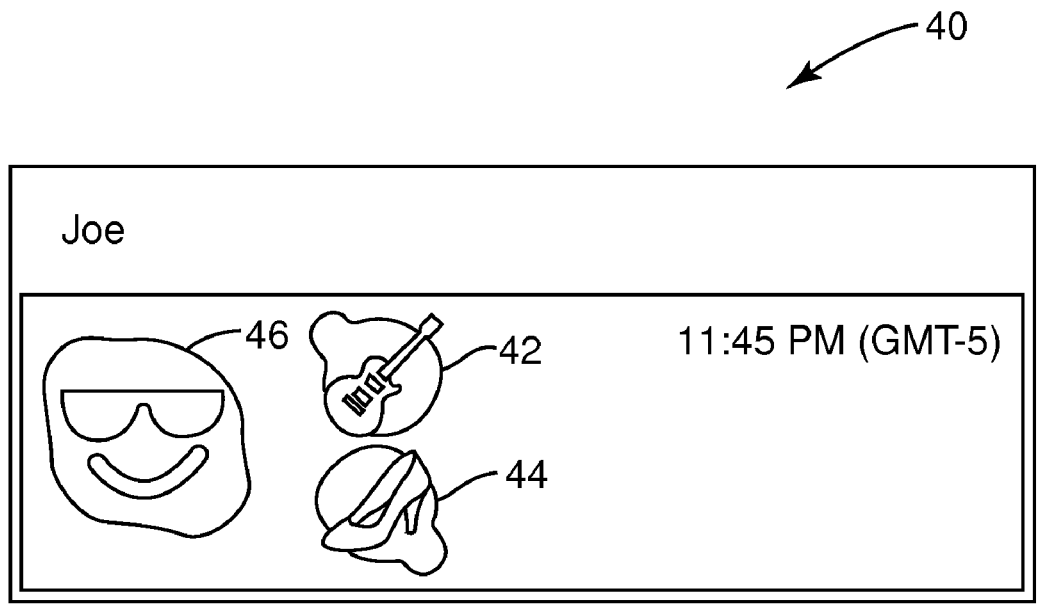
FIG. 2 illustrates an exemplary graphical user interface including a Proximity-based Service Representation (PSR) according to one embodiment of the present invention.
Figure 3:
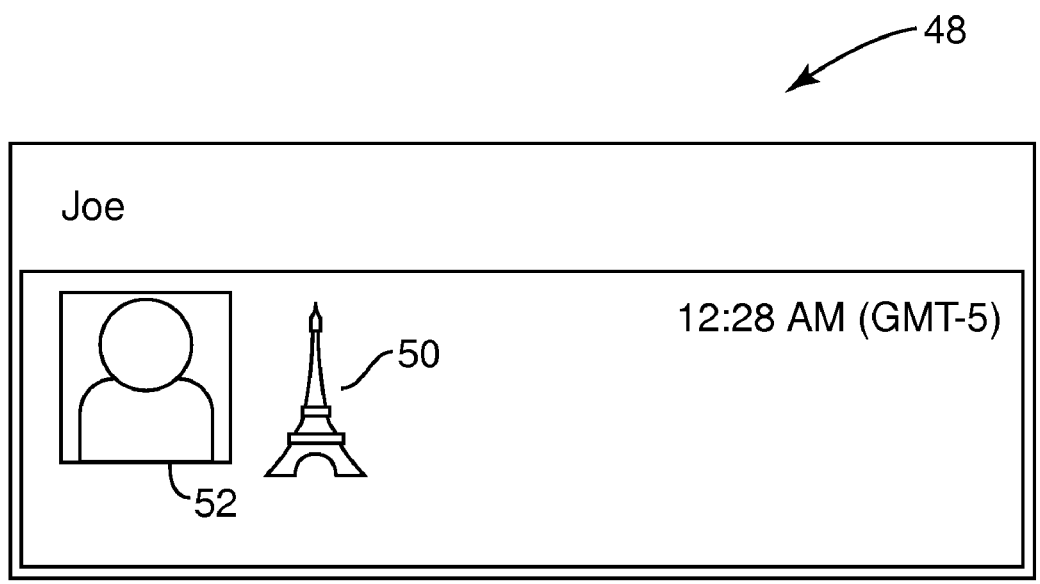
FIG. 3 illustrates another exemplary graphical user interface including a PSR according to one embodiment of the present invention.

FIGS. 2 and 3 illustrate an exemplary graphical user interface that may be presented to, for example, the third-party user 36-1 at the client device 16-1 according to one embodiment of the present invention. The graphical user interfaces of FIGS. 2 and 3 are exemplary and are not intended to limit the scope of the present invention. FIG. 2 illustrates a graphical user interface 40 wherein two PSRs 42 and 44 are presented in association with a PSR host 46 corresponding to the proximity user 24, which in this example is "Joe." The PSR 42 indicates that one or more service providers proximate to the mobile device 12 of the proximity user 24 ("Joe") has published service metadata for music content, or more specifically "Rock" music content to the mobile device 12. The service metadata may be, for example, metadata describing one or more Rock songs or albums available from the one or more service providers. The PSR 44 indicates that one or more service providers proximate to the mobile device 12 of the proximity user 24 ("Joe") has published service metadata for women's shoes to the mobile device 12. The service metadata may be one or more coupons or advertisements for women's shoes. As discussed below, the third-party user 36-1 may then interact with the PSRs 42 and 44 to further explore the service metadata. For example, the third-party user 36-1 may be enabled to select the PSR 42 in order to view the associated service metadata or one or more PSRs that are more specifically descriptive of the music content. For instance, PSRs that are descriptive of sub-genres of the "Rock" genre, artists, albums, time periods, or the like may be presented to the third-party user 36-1 upon selecting the PSR 42. Further, as discussed below, the third-party user 36-1 may be enabled to interact with the PSR 42 and 44 in order to initiate service requests.

FIG. 3 illustrates another exemplary graphical user interface 48 according to the present invention. In this embodiment, a PSR 50 is presented in association with a PSR host 52 corresponding to the proximity user 24, which in this example is "Joe." The PSR 50 indicates that one or more service providers proximate to the mobile device 12 of the proximity user 24 ("Joe") has published service metadata related to Paris, France to the mobile device 12. The service metadata may be, for example, metadata describing one or more pictures taken in Paris such as, for example, one or more picture of the Eiffel Tower.

Figure 4:
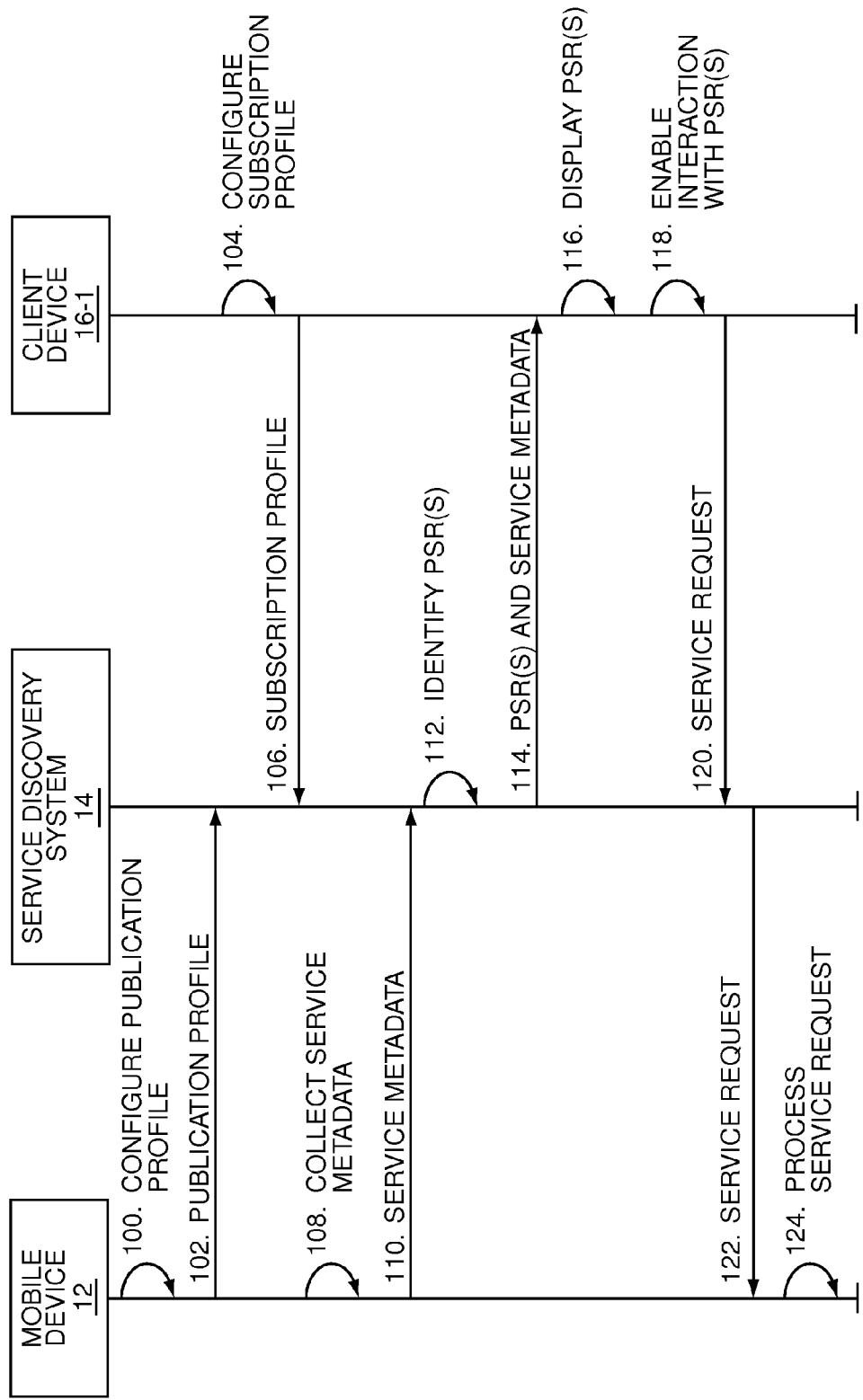
FIG. 4 illustrates the operation of the system of FIG. 1 according to one embodiment of the present invention.

FIG. 4 illustrates the operation of the system 10 of FIG. 1 according to one embodiment of the present invention. In this example, the mobile device 12 configures a publication profile (step 100). More specifically, in one embodiment, the proximity user 24 interacts with the publisher application 18 to define the publication profile. The mobile device 12, and more specifically the publisher application 18, then sends the publication profile, or a portion thereof, to the server 26 of the service discovery system 14 where the publication profile is stored (step 102). In a similar fashion, the client device 16-1, and more specifically the subscriber application 38-1, configures a subscription profile (step 104). In one embodiment, the third-party user 36-1 interacts with the subscriber application 38-1 to configure the subscription profile. The client device 16-1, and more specifically the subscriber application 38-1, then sends the subscription profile to the server 26 of the service discovery system 14 where the subscription profile is stored (step 106).

At some time thereafter, the publisher application 18 of the mobile device 12 collects service metadata from the service providers 20-1 through 20-$N_2$ within the proximate area 22 of the mobile device 12 (step 108). The publisher application 18 then sends the service metadata to the server 26 of the service discovery system 14 (step 110). Note that, in one embodiment, the publisher application 18 provides all service metadata to the service discovery system 14. In another embodiment, the publisher application 18 may filter the service metadata based on the publication profile such that only service metadata to be published is provided to the service discovery system 14.

For this example, assume that the third-party user 36-1 is a subscriber to the service metadata published from the mobile device 12 of the proximity user 24. As such, upon receiving the service metadata, the server 26 of the service discovery system 14 interacts with the PSR generation engine 28 to identify one or more PSRs to be provided to the client device 16-1 associated with the third-party user 36-1 that are indicative of, or representative of, the service metadata (step 112). For example, if the service metadata includes advertisements and coupons, the service discovery system 14 may identify both an advertisement PSR and a coupon PSR for presentation to the third-party user 36-1.

In another embodiment, the service discovery system 14 identifies a number of PSRs applicable to the service metadata in order to form a PSR tree. While the term PSR tree is used herein, the PSRs may be arranged into any type of data structure that may be navigated to explore the published service metadata. More specifically, if, for example, the service metadata is an advertisement and a coupon, the service discovery system 14 may identify a generic service metadata PSR that is descriptive of both the advertisement and coupon to form a first level of the PSR tree. The service discovery system 14 also identifies an advertisement PSR and a coupon PSR for a second level of the PSR tree. In addition, the service discovery system 14 may identify one or more PSRs more specifically descriptive of the advertisement and the coupon. If, for example, the advertisement is an advertisement for women's shoes, the service discovery system 14 may identify a PSR indicative of women's shoes. The PSRs may then be arranged or associated to form the PSR tree where the generic service metadata PSR is the first level of the PSR tree, the advertisement PSR and the coupon PSR are the second level of the PSR tree, and the more specific PSRs describing the type of advertisement and the type of coupon are the third level of the PSR tree.

It should be noted that the server 26 may filter the service metadata before publication to the client devices 16-1 through 16-$N_1$ in order to remove redundant service metadata or highlight redundant metadata. In order to support the redundancy function, the server 26 may maintain an archive or history of the service metadata published to the client devices 16-1 through 16-$N_1$. In addition, the server 26 may time-out previously published service metadata based on time, location, distance between the corresponding service provider and the proximity user 24, or the like. Similarly, the distance between the service provider and the proximity user 24 may be indicated to the third-party user 36-1 and updated as desired.

Once the one or more PSRs are identified, the server 26 of the service discovery system 14 provides PSR data including the one or more PSRs and, optionally, the service metadata to the subscriber application 38-1 of the client device 16-1 (step 114). Alternatively, the PSR data may include references to the one or more PSRs, where the one or more PSRs may thereafter may be obtained from the client device 16-1, from the service discovery system 14, some other remote system, or local storage. In addition, the PSR data may include a trust quotient for the service metadata. The trust quotient may be indicative of a level of trust assigned to the associated service providers. The trust quotient may be determined based on geographic location, time of day, distance from the proximity user 24, other users proximate to the proximity user 24, or the like.

The subscriber application 38-1 of the client device 16-1 then displays at least one of the PSRs to the third-party user 36-1 (step 116). In one embodiment, the subscriber application 38-1 displays the PSR in association with a PSR host such as, for example, some identifier or representation of the proximity user 24. For example, the PSR may be presented in association with an identifier of the proximity user 24 in a contact list or buddy list of the third-party user 36-1 for an instant messaging application, an e-mail application, or the like. Other types of PSR hosts will be apparent to one of ordinary skill in the art. In general, the PSR host may be any identifier of the proximity user 24, any representation of the proximity user 24, or the like. Note that if one or more PSRs are provided, the client device 16-1 may present all of the PSRs or one or more select PSRs. For example, if a PSR tree is provided, the client device 16-1, or alternatively the service discovery system 14, may select one level of the PSR for initial presentation to the third-party user 36-1.

The subscriber application 38-1 of the client device 16-1 then enables the third-party user 36-1 to interact with the one or more PSRs (step 118). More specifically, the third-party user 36-1 is enabled to interact with the PSRs to view the service metadata or at least the content of the service metadata. For example, if the service metadata is or includes an advertisement, the subscriber application 38-1 enables the third-party user 36-1 to interact with an associated PSR in order to view or otherwise be presented with the advertisement. The service metadata may be provided to the client device 16-1 in association with the PSR. Alternatively, the client device 16-1 may request the service metadata from the service discovery system 14 as needed. In addition, if a PSR tree is provided, the subscriber application 38-1 of the client device 16-1 may enable the third-party user 36-1 to interact with the PSRs to navigate up or down the PSR tree to explore the service metadata.

In addition or alternatively, the subscriber application 38-1 of the client device 16-1 may enable the third-party user 36-1 to interact with the one or more PSRs to initiate or generate a service request (step 120). The service request may be a request asking the proximity user 24 to act on the service metadata on behalf of the third-party user 36-1. For example, the service request may be an instant message or the like asking the proximity user 24 to purchase an advertised service or product on behalf of the third-party user 36-1, to obtain a coupon or to purchase a service or product for which there is a coupon, to obtain a free product or service on behalf of the third-party user 36-1, to obtain content items on behalf of the third-party user 36-1, or the like. Alternatively, the service request may be provided directly to the service provider associated with the service metadata from the client device 16-1. As another alternative, the service request may originate at the service discovery system 14 automatically on behalf of the third-party user 36-1 based on preferences of the third-party user 36-1 either defined by the third-party user 36-1 or inferred based on previous activities of the third-party user 36-1. Note that even if the service request is initiated automatically, the one or more PSRs describing the service metadata are preferably still provided to the client device 16-1.

In this example, the server 26 of the service discovery system 14 forwards the service request to the mobile device 12 (step 122), and the publisher application 18 of the mobile device 12 then processes the service request (step 124). For example, if the service request is an instant message asking the proximity user 24 to act on the service metadata, the instant message may be displayed to the proximity user 24. As another example, if the service request is a request to obtain a digital content item, the publisher application 18 may obtain the requested digital content item. Note that the third-party user 36-1 may need to provide a password or similar authorization information to enable the service request. The service request may additionally or alternatively include feedback from the third-party user 36-1.

It should be noted that while a PSR is provided to the client device 16-1 and displayed to the third-party user 36-1 in this example, the present invention is not limited thereto. For example, the service metadata or a portion thereof may alternatively be provided to the client device 16-1 and presented to the third-party user 36-1.

Figure 5:
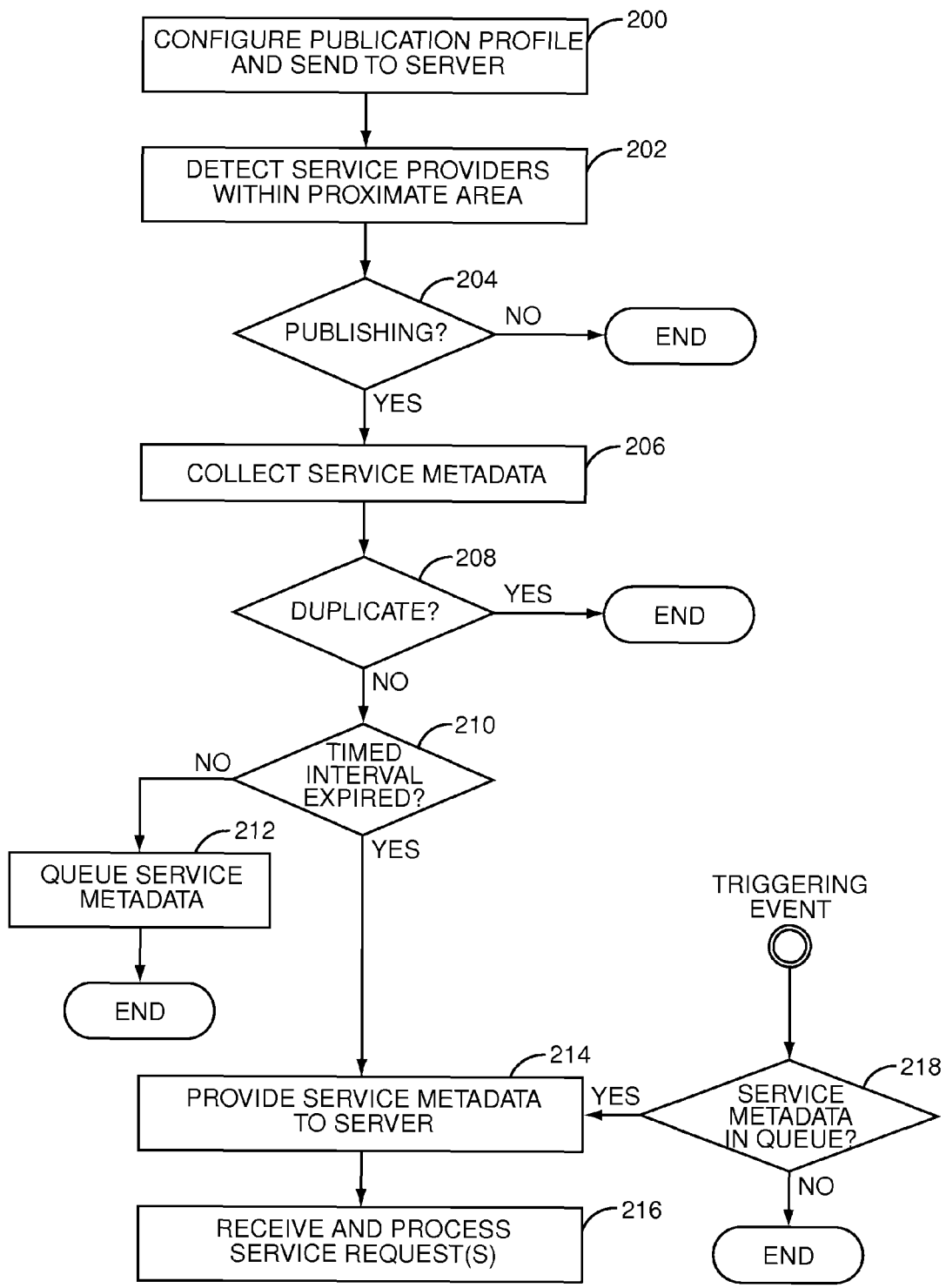
FIG. 5 is a flow chart illustrating the operation of the publisher application of the mobile device of FIG. 1 according to one embodiment of the present invention.

FIG. 5 illustrates the operation of the publisher application 18 of the mobile device 12 in more detail according to one embodiment of the present invention. First, in response to input from the proximity user 24, the publisher application 18 configures the publication profile for the mobile device 12 and sends the publication profile to the server 26 of the service discovery system 14 where it is stored in the publication profiles database 30 (step 200). Note that this example focuses on a single publication profile. However, the present invention is not limited thereto.

Some time thereafter, the publisher application 18 detects the service providers 20-1 through 20-$N_2$ within the proximate area 22 of the mobile device 12 (step 202). Upon detecting the service providers 20-1 through 20-$N_2$ within the proximate area 22, the publisher application 18 determines whether it is enabled to publish service metadata (step 204). For example, publishing may be directly disabled by the proximity user 24, the activity level of the mobile device 12 may be such that service metadata is or is not to be published, the current time of day may be within a range of times during which the publication application is or is not to publish service metadata, environmental characteristics may be such that service metadata is or is not to be published, or the like.

If the publisher application 18 is not to publish any service metadata, the process ends. Otherwise, the publisher application 18 collects service metadata from the service providers 20-1 through 20-$N_2$ within the proximate area 22 (step 206). The service metadata may be broadcast by the service providers 20-1 through 20-$N_2$. As an alternative, the publisher application 18 may request the service metadata from the service providers 20-1 through 20-$N_2$. Optionally, after collecting the service metadata, the publisher application 18 may filter the service metadata based on the publication profile of proximity user 24. The publisher application 18 then determines whether the service metadata collected is duplicate service metadata or, in other words, whether the service metadata has already been received and published (step 208). For example, if the service providers 20-1 through 20-$N_2$ periodically broadcast their service metadata, the publisher application 18 may receive the service metadata more than once. By determining whether the service metadata collected is duplicate service metadata, the publisher application 18 ensures that the same service metadata is not published more than once.

If the service metadata is duplicate service metadata, the process ends. Otherwise, in this example, the publisher application 18 determines whether a predefined time interval has expired (step 210). If not, the service metadata is queued for subsequent delivery to the service delivery system 14 (step 212). The process then ends. If the time interval has expired, the publisher application 18 provides the service metadata and any service metadata previously queued to the server 26 of the service discovery system 14 (step 214). At some point before providing the service metadata to the service discovery system 14, the publisher application 18 may filter the service metadata based on the publication profile. For example, if the publication profile indicates that advertisements are not to be published, the publisher application 18 may filter the service metadata to remove service metadata for advertisements.

Optionally, in response to the service metadata, the publisher application 18 may receive and process one or more service requests in response to the published service metadata (step 216). In an alternative embodiment, receiving and processing service requests may be performed by a separate thread or function.

In this example, in response to a triggering event, the publisher application 18 determines whether there is service metadata in queue to be published (step 218). The triggering event may be the expiration of the predefined time interval of step 210 such that the publisher application 18 does not wait until the next time it collects non-duplicate service metadata to determine whether the predefined interval has expired before publishing the queued service metadata. Alternatively, the triggering event may be any other event that is desired to be used to trigger publication of the service metadata in queue to be published. If there is no service metadata in queue to be published, the process ends. If there is service metadata in queue to be published, the process continues to step 214.

Steps 202 through 218 may be repeated continuously, periodically, or in response to detecting one or more new service providers in the proximate area 22 of the mobile device 12. Also, note that the proximity user 24 may re-configure the publication profile whenever desired.

Figure 6:
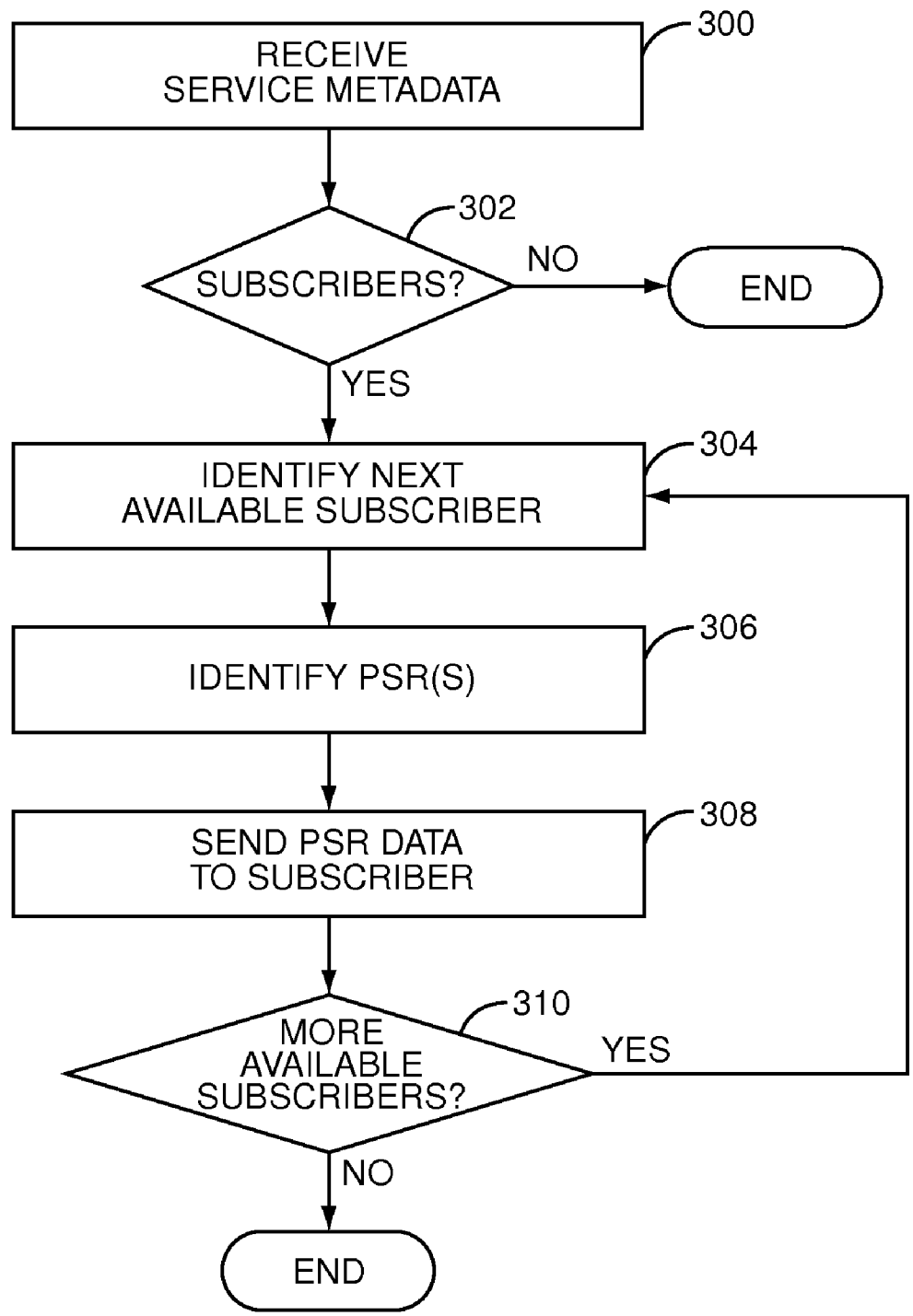
FIG. 6 is a flow chart illustrating the operation of the service discovery system of FIG. 1 according to one embodiment of the present invention.

FIG. 6 illustrates the operation of the service discovery system 14 according to one embodiment of the present invention. First, the server 26 of the service discovery system 14 receives service metadata from the publisher application 18 of the mobile device 12 (step 300). If the service metadata has not already been filtered by the publisher application 18 of the mobile device 12, the server 26 may filter the service metadata based on related restrictions in the publication profile of the proximity user 24, such as restrictions with respect to service type, service quality, service availability, or service classification from the publication profile. In addition, the server 26 may apply any operator-imposed filters. The server 26 then determines whether there are any subscribers for the received service metadata (step 302). More specifically, in one embodiment, the server 26 first identifies any user-based restrictions in the publication profile of the proximity user 24 such as, for example, restrictions to specific third-party users, or subscribers; restrictions to classes or groups of third-party users, or subscribers; restrictions to third-party users, or subscribers, in one or more defined locations; restrictions to third-party users, or subscribers, matching one or more social network parameters; restrictions to third-party users, or subscribers, on a contact list or buddy list of the proximity user 24; or the like. The server 26 then locates the subscription profiles of any third-party users, or subscribers, and identifies any third-party users that are interested in the service metadata and satisfy the user-based restrictions, if any, from the publication profile.

Any third-party users satisfying the requirements of the publication profile of the proximity user 24, having expressed an interest in the service metadata in their subscription profiles, and satisfying any requirements of the service metadata such as being in a target group of the service metadata are subscribers for the service metadata. If there are no subscribers for the service metadata, the process ends. Otherwise, the server 26 identifies the next available subscriber (step 304). For the first iteration, the next available subscriber is a first available subscriber. An available subscriber is a third-party user 36-1, 36-N$_1$ that is a subscriber to the service metadata from the proximity user 24 and whose client device 16-1, 16-N$_1$ is currently connected or able to connect to the server 26 of the service discovery system 14.

Assuming that the third-party user 36-1 is identified as the next available subscriber, the server 26 then identifies one or more PSRs indicative or representative of the service metadata to be provided to the client device 16-1 of the third-party user 36-1 (step 306). Again, note that a single PSR may be identified. Alternatively, multiple PSRs may be identified and optionally arranged into a PSR tree. More specifically, the server 26 sends a request to the PSR generation engine 28. The request may include the service metadata, or a portion thereof, and optionally either an identifier of the third-party user 36-1 or preferences of the third-party user 36-1. In response, the PSR generation engine 28 selects one or more PSRs from the number of predefined PSRs stored in the PSR classification and content database 34. Optionally, the one or more PSRs may be arranged into a PSR tree.

Figure 7:
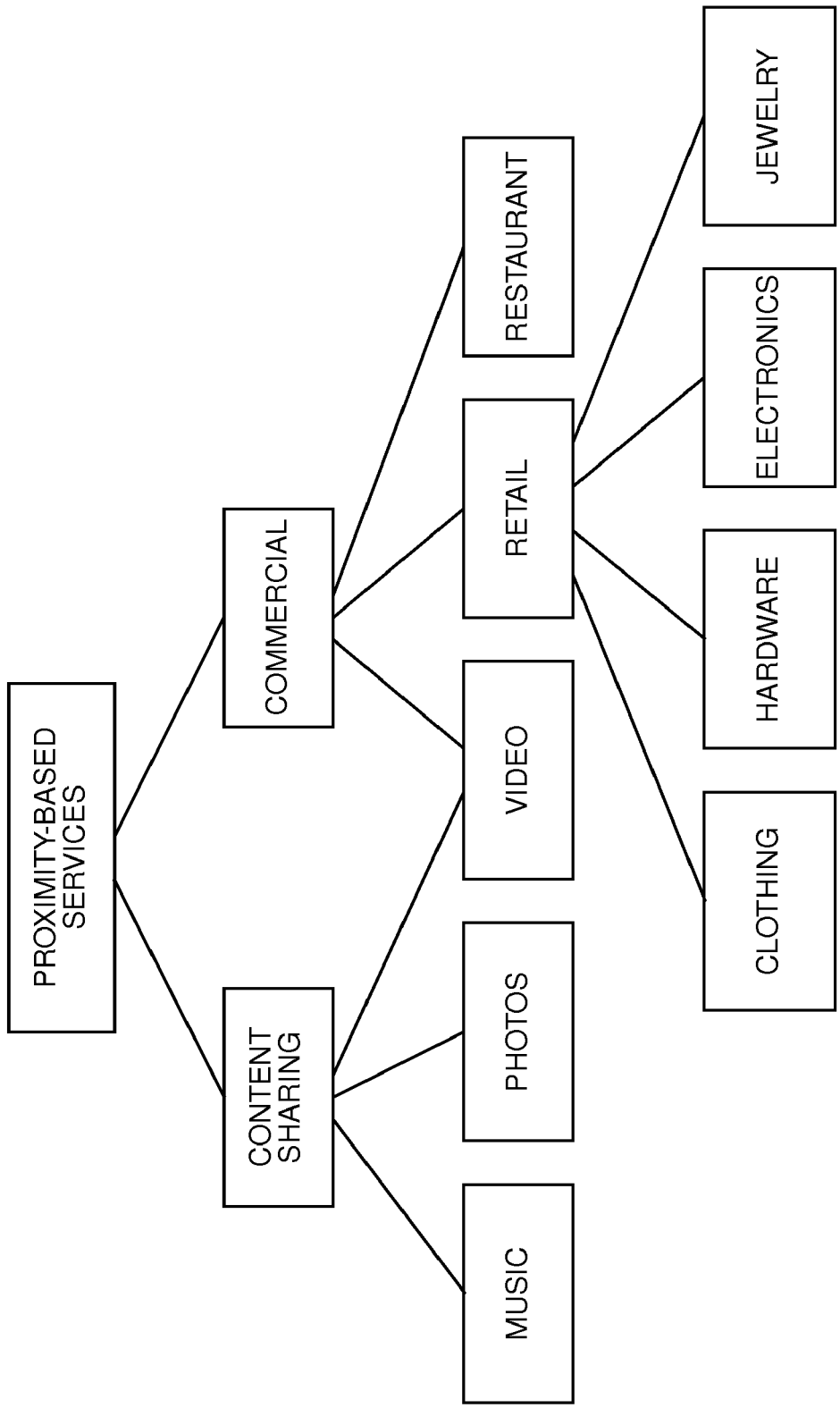
FIG. 7 illustrates an exemplary data structure defining a number of PSRs according to one embodiment of the present invention.

In one embodiment, the number of predefined PSRs are defined by an ontology, taxonomy, or similar data structure, an example of which is illustrated in FIG. 7. For this discussion, the term "ontology" is used. However, it should be appreciated that any other similar data structure may be used. Each node in the ontology corresponds to a PSR. One or more rules are associated with each node in the ontology, where the rules define when the corresponding PSRs are applicable. The actual PSR, which may be a graphic or similar content, is also associated with each node in the ontology. As such, the PSR generation engine 28 compares the rules for the nodes in the ontology and the service metadata to identify one or more PSRs that are applicable to the service metadata. For example, referring to FIG. 7, the proximity-based services PSR, the content sharing PSR, and the music PSR may be applicable. The PSR generation engine 28 may then use the preferences of the third-party user 36-1 to select one of the applicable PSRs to be presented, or initially presented, to the third-party user 36-1. For example, the preferences of the third-party user 36-1 may be such that the content sharing PSR is selected. As discussed below, the third-party user 36-1 may be enabled to interact with the PSR to navigate up the PSR tree from the content sharing PSR to the proximity-based services PSR or down the PSR tree from the content sharing PSR to the music PSR. Note that if photos were also shared, both the music PSR and the photos PSR may be presented when the third-party user 36-1 navigates down the PSR tree from the content sharing PSR to the adjacent level of the PSR tree.

Returning to FIG. 6, once the PSR generation engine 28 identifies the one or more PSRs, the one or more PSRs or identifiers of the one or more PSRs are returned to the server 26. The server 26 then sends PSR data including the one or more PSRs or references to the one or more PSRs, the service metadata, and optionally a trust quotient for the service metadata to the client device of the subscriber, which in this example is the client device 16-1 of the third-party user 36-1 (step 308). In addition, if a PSR tree is to be provided, the PSR data may include information defining the arrangement of the PSRs in the PSR tree. The server 26 then determines whether there are one or more available subscribers (step 310). If so, the process returns to step 304 and is repeated. Otherwise, the process ends.

In the example above, PSRs are used to represent service metadata collected and published by the mobile device 12. However, the present invention is not limited thereto. PSRs may be desired when, for example, the mobile device 12 collects and publishes a large amount of service metadata and/or when it is desirable to quickly identify a class of services. For example, if the mobile device 12 collects and publishes service metadata for many advertisements, a single PSR representative of advertisements may be identified and provided to the client device 16-1 for presentation to the third-party user 36-1. Further, if the advertisements include, for example, a number of shoe advertisements and a number of jewelry advertisements, the third-party user 36-1 may be enabled to interact with the general advertisement PSR such that more specific PSRs indicative of shoe and jewelry advertisements are then presented to the third-party user 36-1. In one embodiment, the service discovery system 14 provides all applicable PSRs and their associations to the client device 16-1 such that the PSRs are available as the third-party user 36-1 navigates up or down the PSR tree for the service metadata. Alternatively, as the third-party user 36-1 interacts with the PSR, the client device 16-1 may interact with the service discovery system 14 to obtain the needed PSRs.

Figure 8:
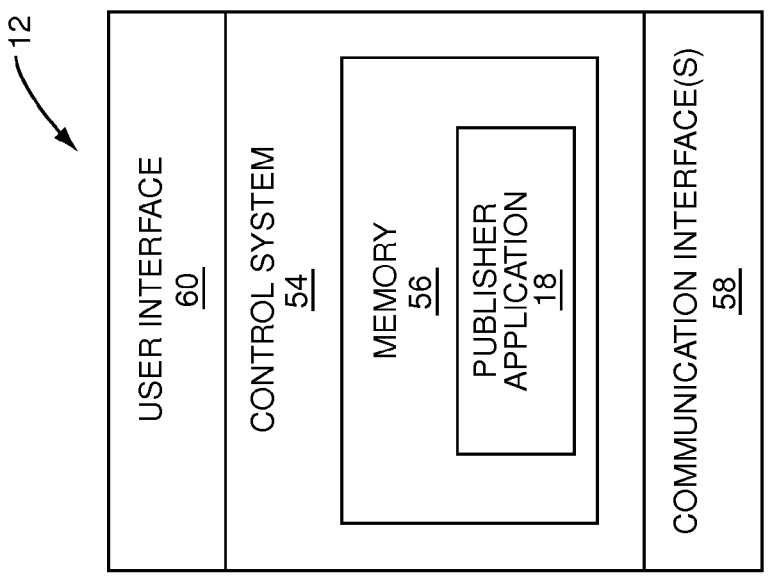
FIG. 8 is a block diagram of the mobile device of FIG. 1 according to one embodiment of the present invention.

FIG. 8 is a block diagram of the mobile device 12 according to one embodiment of the present invention. In general, the mobile device 12 includes a control system 54 having associated memory 56. In this example, the publisher application 18 is implemented in software and stored in memory 56. However, the present invention is not limited thereto. The publisher application 18 may alternatively be implemented in hardware or a combination of software and hardware. The mobile device 12 also includes one or more communication interfaces 58 for communication with the service providers 20-1 through 20-$N_2$ within the proximate area 22 of the mobile device 12. For example, the mobile device 12 may include a local wireless interface for communicating with the service providers 20-1 through 20-$N_2$. The local wireless communication interface may be, for example, a Bluetooth communication interface, a communication interface operating according to one of the suite of IEEE 802.11 standards, a Wi-Fi communication interface, or the like. In addition, the mobile device 12 may include a cellular wireless interface providing access to the service discovery system 14. The cellular wireless interface may operate according to, for example, the Global System for Mobile Communications (GSM) standard, the Wideband Code Division Multiple Access (WCDMA) standard, the Code Division Multiple Access (CDMA) standard, or the like. As another example, the mobile device 12 may communicate with both the service providers 20-1 through 20-$N_2$ and the service discovery system 14 via a single interface. More specifically, the mobile device 12 may communicate with the service providers 20-1 through 20-$N_2$ via direct wireless communication links with the service providers 20-1 through 20-$N_2$ and communicate with the service discovery system 14 via the Internet, which may be made accessible via a wireless LAN. Lastly, the mobile device 12 includes a user interface 60, which may include components such as, for example, a display, one or more user input devices, speakers, and the like.

Figure 9:
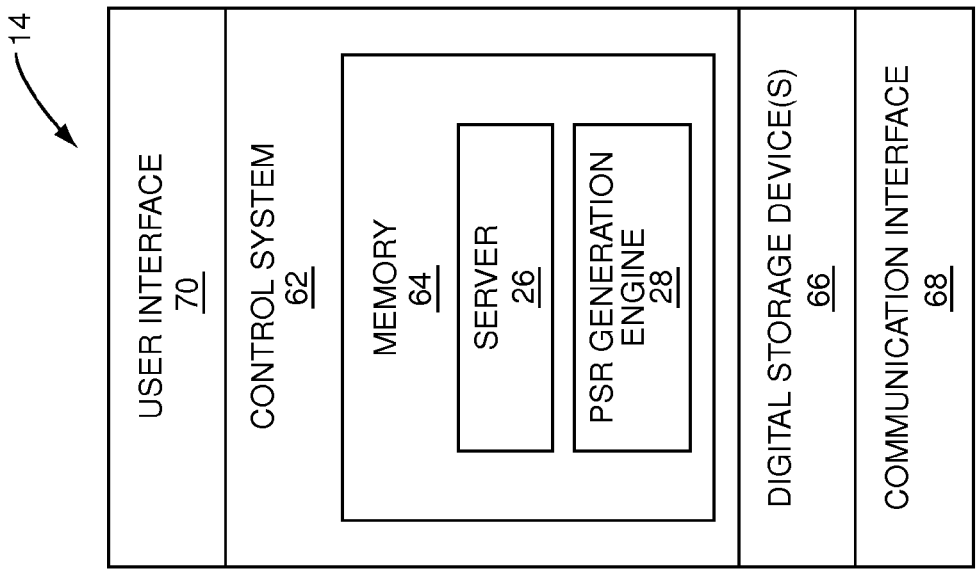
FIG. 9 is a block diagram of the service discovery system of FIG. 1 according to one embodiment of the present invention.

FIG. 9 is a block diagram of the service discovery system 14 according to one embodiment of the present invention. The service discovery system 14 includes a control system 62 having associated memory 64. In this example, the server 26 and the PSR generation engine 28 are implemented in software and stored in the memory 64. However, the present invention is not limited thereto. Each of the server 26 and the PSR generation engine 28 may alternatively be implemented in hardware or a combination of software and hardware. The service discovery system 14 also includes one or more digital storage devices 66 such as, for example, one or more hard-disk drives. The publication profiles database 30, the subscription profiles database 32, and the PSR classification and content database 34 may be stored in the one or more digital storage devices 66. However, the present invention is not limited thereto. All or a portion of the databases 30-34 may be stored in, for example, the memory 64. The service discovery system 14 also includes a communication interface 68 communicatively coupling the service discovery system 14 to the mobile device 12 and the client devices 16-1 through 16-$N_1$ via one or more networks. The service discovery system 14 may also include a user interface 70, which may include components such as, for example, a display, one or more user input devices, speakers, and the like.

Figure 10:
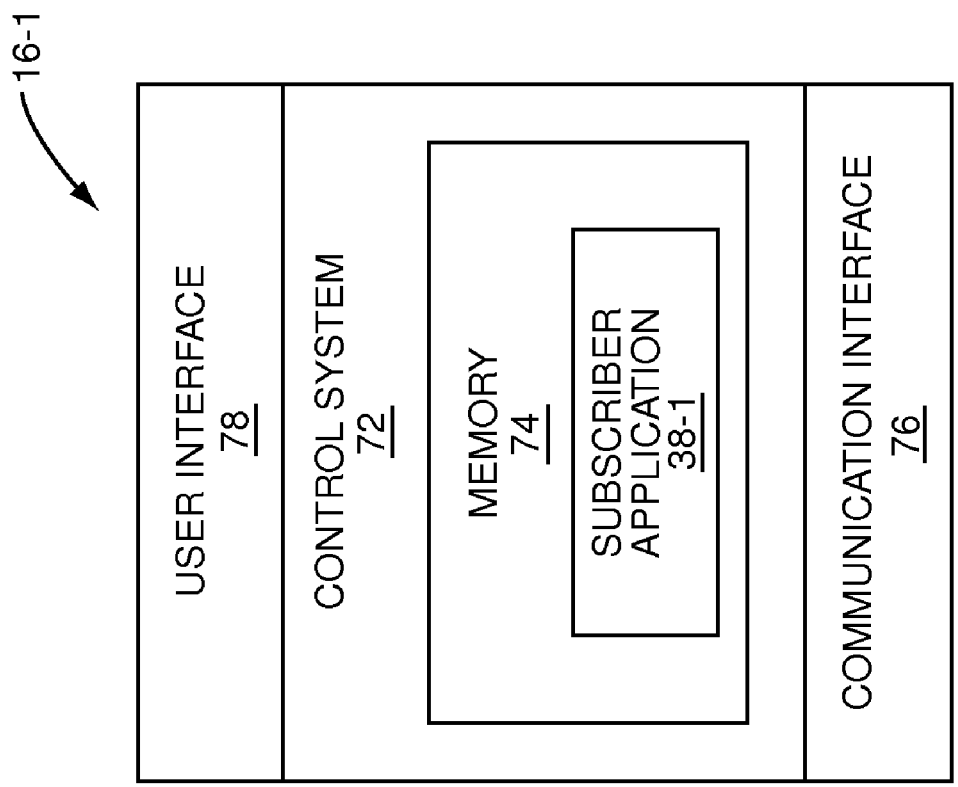
FIG. 10 is a block diagram of one of the client devices of FIG. 1 according to one embodiment of the present invention.

FIG. 10 is a block diagram of the client device 16-1 according to one embodiment of the present invention. This discussion is equally applicable to the other client devices 16-2 through 16-$N_1$. In general, the client device 16-1 includes a control system 72 having associated memory 74.

In this example, the subscriber application 38-1 is implemented in software and stored in the memory 74. However, the present invention is not limited thereto. The subscriber application 38-1 may alternatively be implemented in hardware or a combination of software and hardware. The client device 16-1 also includes a communication interface 76 communicatively coupling the client device 16-1 to the service discovery system 14 via a network. The client device 16-1 also includes a user interface 78, which may include components such as, for example, a display, one or more user input devices, speakers, and the like.

The present invention provides substantial opportunity for variation. For example, the PSR generation engine 28 may alternatively be implemented on the client devices 16-1 through 16-$N_1$. More specifically, each of the client devices 16-1 through 16-$N_1$ may include a PSR generation engine 28 and store or otherwise have access to the PSR classification and content database 34. Thus, in operation, the server 26 may provide all service metadata or service metadata to which the third-party users 36-1 through 36-$N_1$ are subscribed to the associated client devices 16-1 through 16-$N_1$. The PSR generation engine 38 of the client devices 16-1 through 16-$N_1$ may then select one or more PSRs for presentation to the third-party users 36-1 through 36-$N_1$ as described above.

Those skilled in the art will recognize improvements and modifications to the preferred embodiments of the present invention. All such improvements and modifications are considered within the scope of the concepts disclosed herein and the claims that follow.

What is claimed is:

1. A method comprising:
identifying a third-party user subscribed to service metadata collected by a mobile device from at least one service provider, the at least one service provider being a separate entity from the mobile device and is within a proximate area around the mobile device;
wherein the service metadata is indicative of data provided by the at least one service provider within the proximate area;
wherein identifying the third-party user subscribed to the service metadata comprises identifying the third-party user subscribed to the service metadata from a plurality of third-party users based on:
subscription profiles of the plurality of third-party users; and
a publication profile associated with the mobile device where the publication profile is configured by a proximity user associated with the mobile device;
providing to a client device associated with the third-party user at least one of a group consisting of:
the service metadata;
and indicia representative of the service metadata; and
in response to the providing at least one of a group consisting of: the service metadata and indicia representative of the service metadata, receiving a request from the third-party user requesting the proximity user to obtain the data associated with the service metadata on behalf of the third-party user from the service provider.

2. The method of claim 1 further comprising:
for each one of the plurality of third-party users, providing to a client device associated with the one of the plurality of third-party users at least one of the group consisting of: the service metadata and indicia representative of the service metadata.

3. The method of claim 1 further comprising:
collecting, at the mobile device, service metadata from the at least one service provider within the proximate area around the mobile device; and
providing the service metadata for publication.

4. The method of claim 3 wherein providing the service metadata for publication comprises:
  filtering the service metadata based on the publication profile associated with the mobile device; and
  providing the filtered service metadata for publication.

5. The method of claim 3 wherein:
  providing the service metadata for publication comprises providing the service metadata to a remote system;
  identifying the third-party user subscribed to the service metadata comprises identifying, at the remote system, the third-party user subscribed to the service metadata from the plurality of third-party users based on the subscription profiles of the plurality of third-party users; and
  providing to the client device associated with the third-party user the at least one of the group consisting of the service metadata and the indicia representative of the service metadata comprises providing to the client device from the remote system the at least one of the group consisting of: the service metadata and the indicia representative of the service metadata.

6. The method of claim 1 wherein providing to the client device associated with the third-party user the at least one of the group consisting of: the service metadata and the indicia representative of the service metadata comprises:
  selecting at least one of a plurality of predefined proximity-based service representations that is applicable to the service metadata; and
  providing one of a group consisting of: the at least one of the plurality of predefined proximity-based service representations and a reference to the at least one of the plurality of predefined proximity-based service representations to the client device associated with the third-party user.

7. The method of claim 6 wherein selecting the at least one of the plurality of predefined proximity-based service representations comprises selecting the at least one of the plurality of predefined proximity-based service representations based on the service metadata and preferences of the third-party user.

8. The method of claim 6 wherein the client device associated with the third-party user enables the third-party user to interact with the at least one of the plurality of predefined proximity-based service representations to initiate a service request.

9. The method of claim 1 wherein providing to the client device associated with the third-party user the at least one of the group consisting of: the service metadata and the indicia representative of the service metadata comprises:
  identifying a plurality of proximity-based service representations applicable to the service metadata;
  providing the plurality of proximity-based service representations to the client device associated with the third-party user; and
  enabling the third-party user to interact with the plurality of proximity-based service representations at the client device to explore the service metadata.

10. The method of claim 1 wherein the service metadata comprises at least one of a group consisting of: an advertisement for a service, an advertisement for a product, a coupon for a service, a coupon for a product, a notice of a free service, a notice of a free product, information identifying accessible digital content, information describing accessible digital content, information relating to collaboration activities, and information relating to gaming interactions.

11. A method comprising:
  obtaining, from a mobile device, service metadata collected by the mobile device from at least one service provider, the at least one service provider being a separate entity from the mobile device and is within a proximate area around the mobile device;
  wherein the service metadata is indicative of data provided by the at least one service provider within the proximate area;
  identifying a third-party user subscribed to the service metadata, wherein identifying the third-party user subscribed to the service metadata comprises identifying the third-party user subscribed to the service metadata from a plurality of third-party users based on:
    subscription profiles of the plurality of third-party users; and
    a publication profile associated with the mobile device where the publication profile is configured by a proximity user associated with the mobile device;
  providing to a client device associated with the third-party user at least one of a group consisting of:
    the service metadata; and
    indicia representative of the service metadata; and
  in response to the providing at least one of a group consisting of the service metadata and indicia representative of the service metadata, receiving a request from the third-party user requesting the proximity user to obtain the data associated with the service metadata on behalf of the third-party user from the service provider.

12. The method of claim 11 wherein providing to the client device associated with the third-party user the at least one of the group consisting of: the service metadata and the indicia representative of the service metadata comprises:
  selecting at least one of a plurality of predefined proximity-based service representations that is applicable to the service metadata; and
  providing one of a group consisting of the at least one of the plurality of predefined proximity-based service representations and a reference to the at least one of the plurality of predefined proximity-based service representations to the client device associated with the third-party user.

13. The method of claim 12 wherein selecting the at least one of the plurality of predefined proximity-based service representations comprises selecting the at least one of the plurality of predefined proximity-based service representations based on the service metadata and preferences of the third-party user.

14. The method of claim 12 wherein the client device associated with the third-party user enables the third-party user to interact with the at least one of the plurality of predefined proximity-based service representations to initiate a service request.

15. The method of claim 11 wherein providing to the client device associated with the third-party user the at least one of the group consisting of: the service metadata and the indicia representative of the service metadata comprises:
  identifying a plurality of proximity-based service representations applicable to the service metadata;
  providing the plurality of proximity-based service representations to the client device associated with the third-party user; and
  enabling the third-party user to interact with the plurality of proximity-based service representations at the client device to explore the service metadata.

16. The method of claim 11 wherein the service metadata comprises at least one of a group consisting of: an advertisement for a service, an advertisement for a product, a coupon for a service, a coupon for a product, a notice of a free service, a notice of a free product, information identifying accessible digital content, information describing accessible digital content, information relating to collaboration activities, and information relating to gaming interactions.

17. A system comprising:
 a) a communication interface; and
 b) a control system associated with the communication interface and adapted to:
  i) obtain, from a mobile device via the communication interface, service metadata collected by the mobile device from at least one service provider, the at least one service provider being a separate entity from the mobile device, wherein the at least one service provider is within a proximate area around the mobile device, wherein the service metadata is indicative of data provided by the at least one service provider within the proximate area;
  ii) identify a third-party user subscribed to the service metadata, wherein identifying the third-party user subscribed to the service metadata comprises identifying the third-party user subscribed to the service metadata from a plurality of third-party users based on:
   subscription profiles of the plurality of third-party users; and
   a publication profile associated with the mobile device where the publication profile is configured by a proximity user associated with the mobile device;
  iii) provide at least one of a group consisting of:
   the service metadata; and
   indicia representative of the service metadata to a client device associated with the third-party user via the communication interface; and
  iv) in response to the providing at least one of a group consisting of: the service metadata and indicia representative of the service metadata, receive a request from the third-party user the proximity user to obtain the data associated with the service metadata on behalf of the third-party user from the service provider.

18. The system of claim 17 wherein the control system is further adapted to:
 select at least one of a plurality of predefined proximity-based service representations that is applicable to the service metadata; and
 provide one of a group consisting of: the at least one of the plurality of predefined proximity-based service representations and a reference to the at least one of the plurality of predefined proximity-based service representations to the client device associated with the third-party user, wherein the at least one of the plurality of predefined proximity-based service representations is the indicia representative of the service metadata.

19. The system of claim 18 wherein the control system is further adapted to select the at least one of the plurality of predefined proximity-based service representations based on the service metadata and preferences of the third-party user.

20. The system of claim 18 wherein the client device associated with the third-party user enables the third-party user to interact with the at least one of the plurality of predefined proximity-based service representations to initiate a service request.

21. The system of claim 17 wherein the control system is further adapted to:
 identify a plurality of proximity-based service representations applicable to the service metadata; and
 provide the plurality of proximity-based service representations to the client device associated with the third-party user via the communication interface as the indicia representative of the service metadata;
 wherein the third-party user is enabled to interact with the plurality of proximity-based service representations at the client device to explore the service metadata.

22. The system of claim 17 wherein the service metadata comprises at least one of a group consisting of: an advertisement for a service, an advertisement for a product, a coupon for a service, a coupon for a product, a notice of a free service, a notice of a free product, information identifying accessible digital content, information describing accessible digital content, information relating to collaboration activities, and information relating to gaming interactions.

23. A method comprising:
 identifying a third-party user subscribed to service metadata collected by a mobile device from at least one service provider which is a separate entity from the mobile device and is within a proximate area around the mobile device, the service metadata being indicative of data provided by the at least one service provider within the proximate area, wherein identifying the third-party user subscribed to the service metadata comprises identifying the third-party user subscribed to the service metadata from a plurality of third-party users based on subscription profiles of the plurality of third-party users and a publication profile associated with the mobile device where the publication profile is configured by a proximity user associated with the mobile device;
 providing to a client device associated with the third-party user at least one of a group consisting of: the service metadata and indicia representative of the service metadata, wherein providing to the client device associated with the third-party user the at least one of the group consisting of: the service metadata and the indicia representative of the service metadata comprises:
  identifying a plurality of proximity-based service representations applicable to the service metadata;
  providing the plurality of proximity-based service representations to the client device associated with the third-party user; and
  enabling the third-party user to interact with the plurality of proximity-based service representations at the client device to explore the service metadata;
 in response to the providing at least one of a group consisting of: the service metadata and indicia representative of the service metadata, receiving a request from the third-party user requesting the proximity user to obtain the data associated with the service metadata on behalf of the third-party user from the service provider;
 enabling collection, at the mobile device, service metadata from the at least one service provider within the proximate area around the mobile device; and
 providing the service metadata to a remote system for publication.

* * * * *